United States Patent [19]

Shoujima

[11] Patent Number: 5,754,778
[45] Date of Patent: May 19, 1998

[54] ELECTRONIC MAIL SYSTEM

[75] Inventor: Kenichi Shoujima, Kashihara, Japan

[73] Assignee: Sharp Kabushiki Kaisha, Osaka, Japan

[21] Appl. No.: 691,864

[22] Filed: Aug. 2, 1996

[30] Foreign Application Priority Data

Aug. 4, 1995 [JP] Japan .................. 7-199754

[51] Int. Cl.$^6$ .................................................. G06F 13/00
[52] U.S. Cl. ................................................ 395/200.36
[58] Field of Search ........................ 395/200.36, 200.46, 395/200.64, 200.65

[56] References Cited

U.S. PATENT DOCUMENTS

| | | | |
|---|---|---|---|
| 5,278,984 | 1/1994 | Batchelor | 395/200.37 |
| 5,333,247 | 7/1994 | Gest et al. | 395/138 |
| 5,548,789 | 8/1996 | Nakanura | 395/853 |

FOREIGN PATENT DOCUMENTS 6-290122  10/1994  Japan .

OTHER PUBLICATIONS

Brachman et al., "Fragmentation in Store–and–Forward Message Transfer", Communications Magazine, IEEE, vol. 26, ISS. 7, Jul. 1988, pp. 18–27.

*Primary Examiner*—William M. Treat
*Attorney, Agent, or Firm*—David G. Conlin; David D. Lowry

[57] ABSTRACT

An electronic mail system includes a mail server for storing electronic mail and a receiving terminal for receiving and displaying the electronic mail on a display section. The mail server divides the electronic mail stored in the mail storage section into a plurality of portions in accordance with an available capacity in a memory section of the receiving terminal, and stores the portions of the electronic mail in a divided mail memory section. The receiving terminal requests the portion of the electronic mail to be sent, receives at a receiving section the portions sequentially sent, and stores the portions in the memory section. The portions of the original electronic mail stored in the memory section are sequentially displayed on a display section with an instruction through an input section.

7 Claims, 12 Drawing Sheets

FIG. 8

| ITEM | VALUE |
|---|---|
| MAIL NUMBER | 3/9 |
| STORATE ADDRESS | 9500H |
| SIZE | 36H |
| MAIL NUMBER | 4/9 |
| STORATE ADDRESS | 9536H |
| SIZE | 3AH |
| MAIL NUMBER | NONE |
| STORATE ADDRESS | 9570H |
| SIZE | 40H |

FIG. 12(a)

| ITEM | VALUE |
|---|---|
| MAIL NUMBER | 1/9 |
| STORATE ADDRESS | 9500H |
| SIZE | 40H |
| MAIL NUMBER | 2/9 |
| STORATE ADDRESS | 9540H |
| SIZE | 40H |
| MAIL NUMBER | 3/9 |
| STORATE ADDRESS | 9580H |
| SIZE | 40H |

FIG. 12(b)

| ITEM | VALUE |
|---|---|
| MAIL NUMBER | NONE |
| STORATE ADDRESS | 9500H |
| SIZE | 30H |
| MAIL NUMBER | NONE |
| STORATE ADDRESS | 9540H |
| SIZE | 29H |
| MAIL NUMBER | 3/9 |
| STORATE ADDRESS | 9580H |
| SIZE | 39H |

FIG. 12(c)

| ITEM | VALUE |
|---|---|
| MAIL NUMBER | 3/9 |
| STORATE ADDRESS | 9500H |
| SIZE | 40H |
| MAIL NUMBER | 4/9 |
| STORATE ADDRESS | 9540H |
| SIZE | 40H |
| MAIL NUMBER | NONE |
| STORATE ADDRESS | 9580H |
| SIZE | 70H |

FIG. 12(d)

| ITEM | VALUE |
|---|---|
| MAIL NUMBER | 3/9 |
| STORATE ADDRESS | 9500H |
| SIZE | 40H |
| MAIL NUMBER | 4/9 |
| STORATE ADDRESS | 9540H |
| SIZE | 40H |
| MAIL NUMBER | 5/9 |
| STORATE ADDRESS | 9580H |
| SIZE | 70H |

ELECTRONIC MAIL SYSTEM

FIELD OF THE INVENTION

The present invention relates to an electronic mail system including a receiving terminal for receiving electronic mail sent from a sending terminal to a mail server and stored in the mail server.

BACKGROUND OF THE INVENTION

In an electronics mail (E-mail system) system using, for example, telephone lines, E-mail is sent from a sending terminal and stored in a mail server. Then predetermined E-mail stored in the mail server is sent to the receiving terminal in accordance with a sending request from a receiving terminal.

In such an E-mail system, E-mail sent from the sending terminal and stored in the mail server is usually handled as the smallest unit. In other words, it has been conventionally impossible to divide E-mail into a plurality of portions and send them. Similarly, when E-mail is sent from the mail server to the receiving terminal, the E-mail is handled as the smallest unit.

Therefore, when there is little capacity left in a memory section of the receiving terminal, the E-mail sent from the mail server may not be able to be written in the memory section, thereby not being received properly.

An E-mail system disclosed by Japanese Laid-Open Patent Application No. 6-290122/1994 (Tokukaihei 6-290122) works as follows: An operator designates a semantic relation of information on E-mail contents. Then, the information on the contents is structured based on the semantic relation and sent to an electronic mail center (mail server). When the E-mail is received at a receiving terminal, the structured information is interpreted, and the contents are displayed on a display.

Nevertheless, even in the E-mail system disclosed in Japanese Laid-Open Patent Application No. 6-290122/1994, the E-mail is sent in the above-mentioned unit from the sending terminal to the receiving terminal. Therefore, as in the above case, when there is little capacity left in the memory section of the receiving terminal, E-mail may not be received properly.

SUMMARY OF THE INVENTION

It is an object of the present invention to provide an electronic mail system where all E-mail sent from a mail server can be displayed properly in a display section of a receiving terminal even when the entire E-mail cannot be stored in a memory section because there is little capacity left at a receiving terminal.

In order to achieve the object above, an electronic mail system in accordance with the present invention is characterized in that the electronic mail system has: (1) a terminal including display means, receiving means for receiving electronic mail, and a receiving memory for storing the received electronic mail; and (2) a mail server including a storage memory for storing the electronic mail, dividing means for dividing the electronic mail, and sending means for sending the electronic mail to the terminal, wherein the terminal informs the mail server of an empty capacity of the receiving memory, and the electronic mail is divided into a plurality of portions by the dividing means of the mail server in accordance with the empty capacity of the receiving memory, the portions being sequentially sent to the terminal from the sending means of the mail server and sequentially displayed on the display means of the terminal.

With the above arrangement, the electronic mail is divided into a plurality of portions at the mail server in accordance with the information on the empty capacity of the receiving memory sent from the terminal. The portions are then sent sequentially. This allows the electronic mail to be received and displayed at the terminal even when the empty capacity of the receiving memory of the terminal is small compared with the electronic mail.

Moreover, the dividing means of the mail server preferably divides the electronic mail at a punctuation mark, such as a comma and period. This allows the electronic mail to be divided with no loss in content of the electronic mail.

Furthermore, the terminal preferably includes reception control means for requesting a next portion of the electronic mail to be sent, while the display means is displaying another portion of the electronic mail. This arrangement shortens an apparent time required for the reception of the electronic mail, thereby allowing the operator to receive the electronic mail more efficiently.

For a fuller understanding of the nature and advantages of the invention, reference should be made to the ensuing detailed description taken in conjunction with the accompanying drawings.

BRIEF DESCRIPTION OF THE DRAWINGS

FIG. 8 is an explanatory drawing showing an arrangement of a memory control table of a receiving terminal.

FIGS. 12(a), 12(b), 12(c), and 12(d) are explanatory drawings showing various states of the memory control table while the control with the operation algorithm shown in FIGS. 10 and 11 is being carried out.

DESCRIPTION OF THE EMBODIMENT

Referring to FIGS. 1 through 12, the following description will discuss an embodiment in accordance with the present invention.

Figure 1:
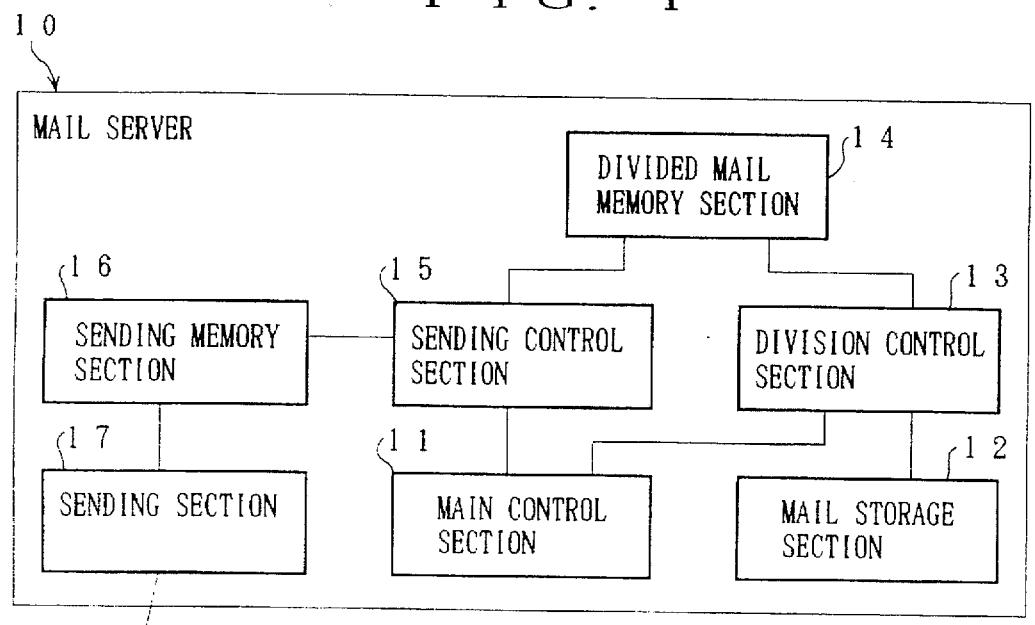
FIG. 1 is a block diagram showing an arrangement of an electronic mail system of an embodiment in accordance with the present invention.
Figure 1:
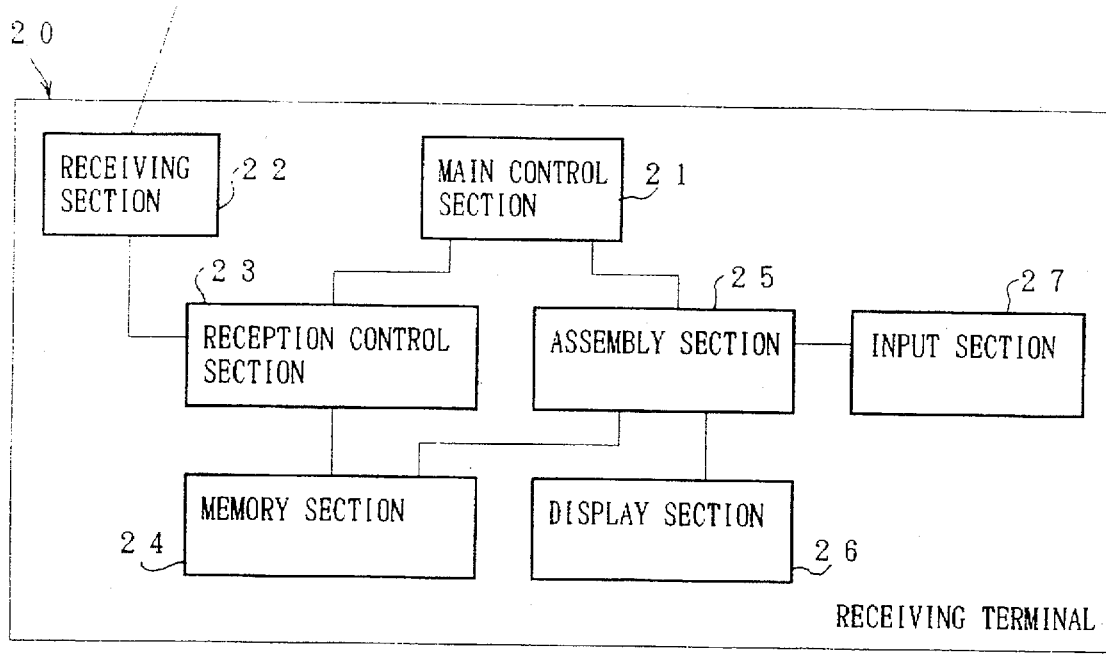

FIG. 1 is a block diagram showing an example of an electronic mail (E-mail) system in accordance with the present invention. The E-mail system includes a mail server 10 which stores E-mail sent from a sending terminal. The mail server 10 is arranged to send predetermined E-mail out of the stored E-mail to a receiving terminal 20.

The mail server 10 has a main control section 11 for controlling the whole operation of the mail server 10, and a mail storage section 12 for storing the E-mail sent from the sending terminal. Receiving from the receiving terminal 20 a sending request signal requesting the E-mail to be sent, the main control section 11 starts a sending process of the E-mail to the receiving terminal 20. The sending request signal from the receiving terminal 20 includes information on available capacity in a memory section 24 of the receiving terminal 20.

Receiving the sending request signal, the main control section 11 instructs a division control section 13 to divide the E-mail to be sent, which is fetched from the mail storage section 12, in accordance with the available capacity in the memory section 24 of the receiving terminal 20. The E-mail to be sent is fetched from the mail storage section 12 by the division control section 13 and stored in a divided mail memory section 14 in which the E-mail is divided into a plurality of portions. That is, those portions are stored in the divided mail memory section 14. When each portion of the E-mail stored in the divided mail memory section 14 is sent to the receiving terminal 20, it is first given to and temporarily stored in a sending memory section 16 by a sending control section 15 which is controlled by the main control section 11, provided with a common header section (details explained later), and then sent to the receiving terminal 20 from a sending section 17.

The receiving terminal 20 has a main control section 21 for controlling the whole operation of the receiving terminal 20, and a receiving section 22 for receiving each portion of the E-mail sent from the mail server 10. Receiving operation of the portions of the E-mail by the receiving section 22 is controlled by a reception control section 23 controlled by the main control section 21. The reception control section 23 instructs the receiving section 22 to request the mail server 10 to send the portions of the E-mail in accordance with the available capacity in the memory section 24.

The portions of the E-mail received at the receiving section 22 are stored in the memory section 24. The portions of the E-mail stored in the memory section 24 is assembled into its original form by an assembly section 25 which is controlled by the main control section 21 and then displayed on a display section 26 in accordance with an instruction by the operator through an input section 27.

Figure 2:
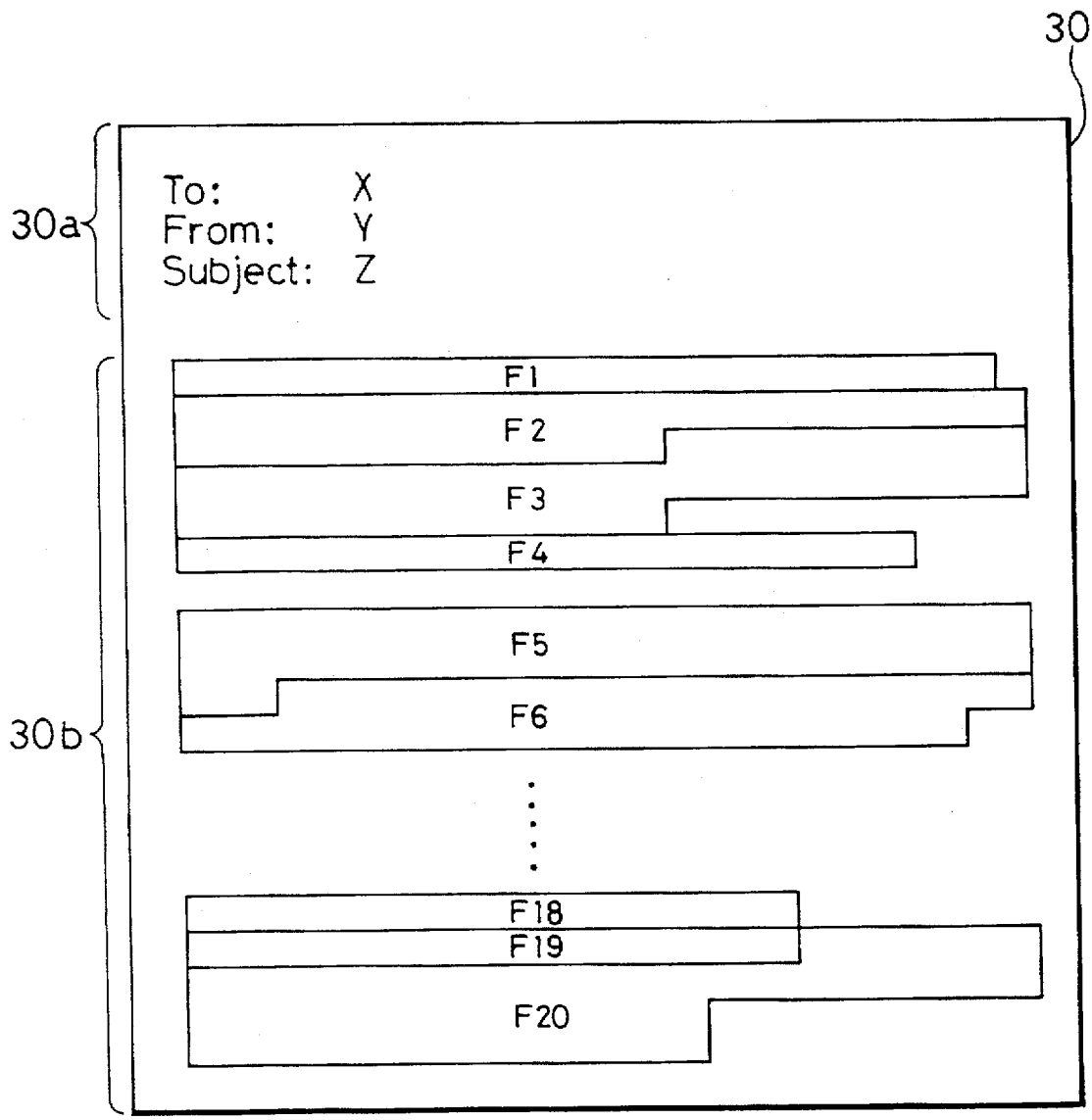
FIG. 2 is a schematic drawing showing an example of electronic mail handled by the electronic mail system.

FIG. 2 is a schematic illustration showing an example of the E-mail stored in the mail storage section 12 of the mail server 10. The E-mail 30 is composed of a main body 30b and a header section 30a which shows the sender, the receiver, and the subject. The main body 30b is composed of a plurality of sentences F1, F2, . . . and F20. The division control section 13 of the mail server 10 divides the main body 30b of such E-mail 30 into the portions right after punctuation marks such as periods and commas, so that the portions are roughly of the same size.

Figure 3:
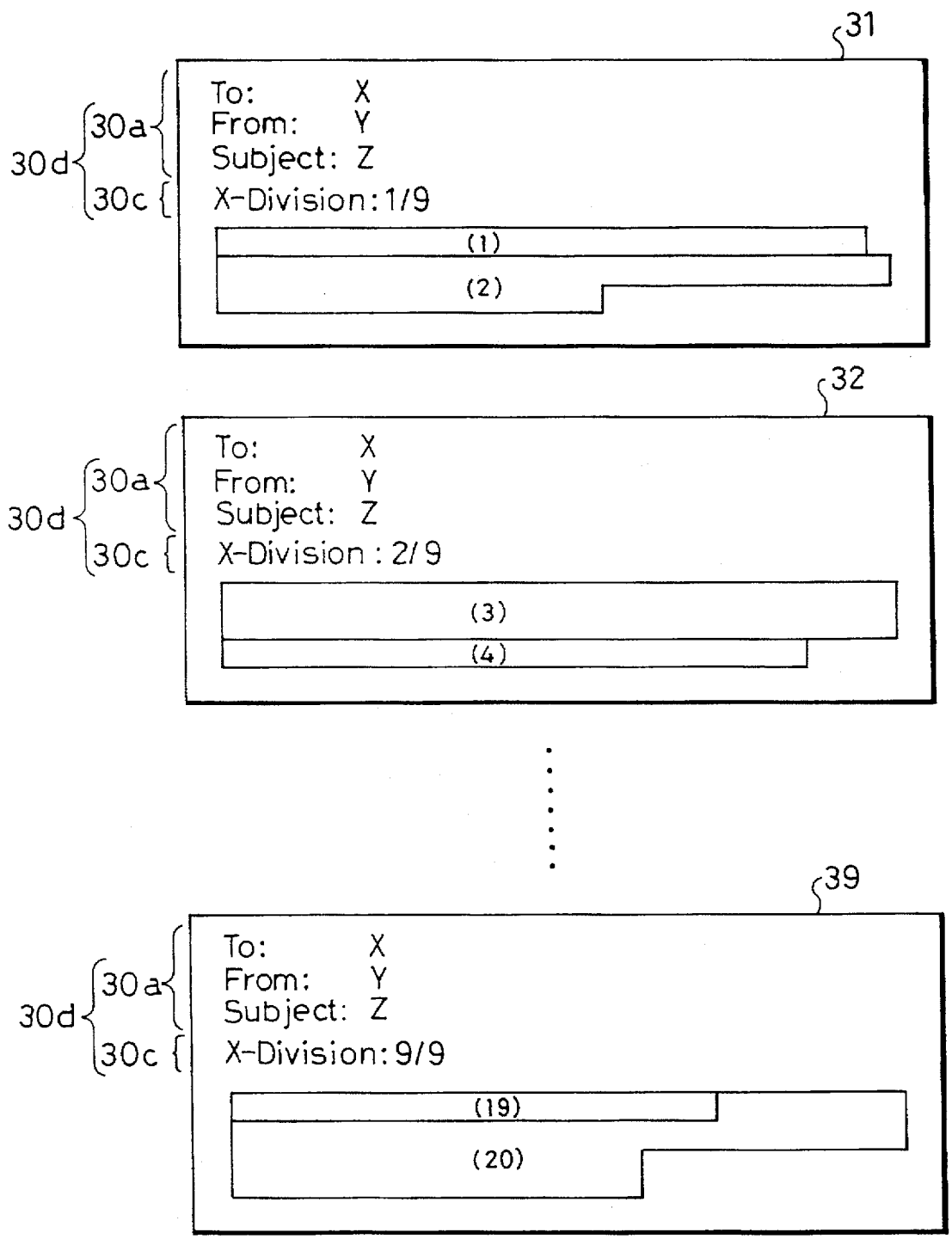
FIG. 3 is a schematic drawing showing the electronic mail shown in FIG. 2 divided into a plurality of portions.

FIG. 3 is a schematic illustration showing an example of a format of the portion of the E-mail stored in the divided mail memory section 14 of the server 10 when the portion of the E-mail is sent to the receiving terminal 20. As shown in FIG. 3, the main body 30b of the E-mail 30 shown in FIG. 2 is divided into, for example, nine portions. These portions are provided respectively with a common header section 30d to be designated as the E-mail 31 through 39 and sent.

The E-mail 31 through 39 has at the beginning thereof the header section 30a which is the same as the header section 30a of the E-mail 30. The header section 30a is followed by a divided E-mail identifier 30c. In this example, the divided E- mail identifier 30c is composed of a symbol, "X-Division", and a fraction representing a mail number. The header section 30a and divided E-mail identifier 30c compose the common header section 30d.

The fraction representing the mail number of the divided E-mail identifier 30c has a denominator representing the total number of the divisions of the main body 30b and a numerator representing the order of the portions from the top of the main body 30b. For example, the mail number 4/9 means that the main body 30b is divided into nine portions and that the fourth portion out of the nine is included in the E-mail of that mail number.

Figure 4:
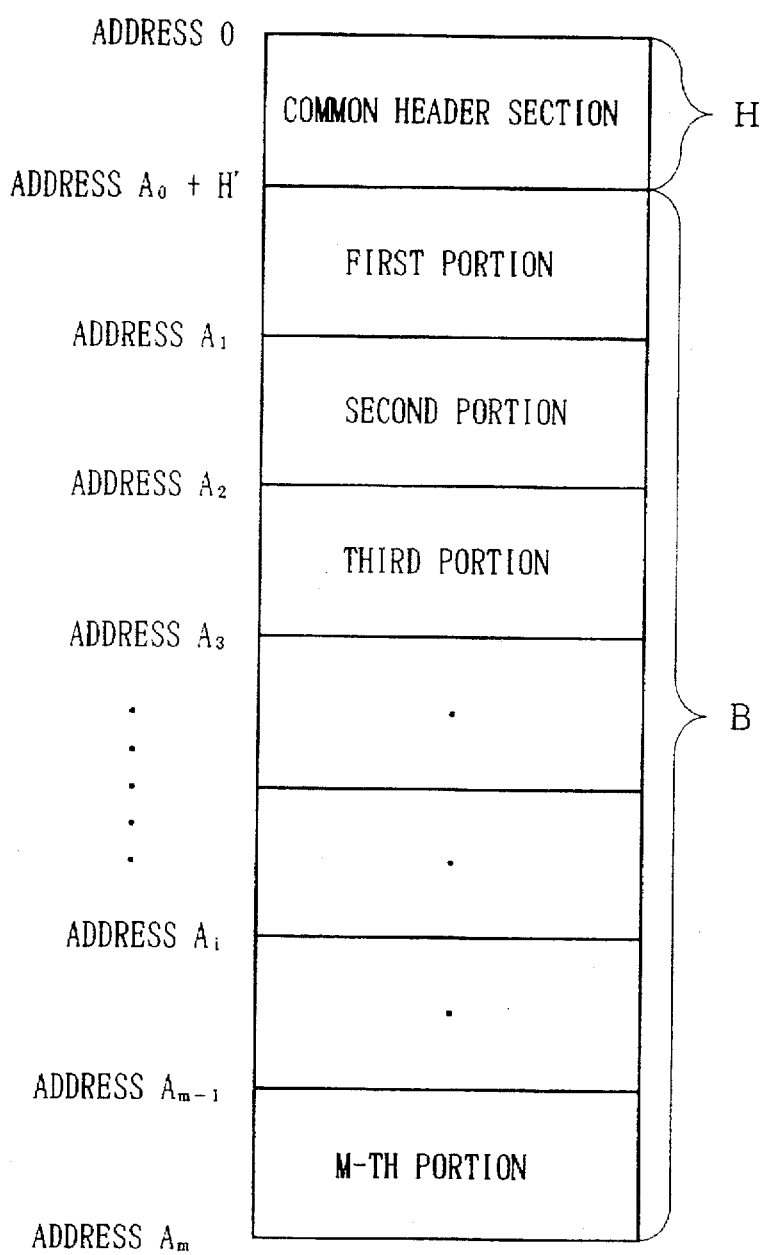
FIG. 4 is an explanatory drawing showing an address arrangement of a divided mail memory section of a mail server, illustrating that the electronic mail divided by a division control section is stored.
Figure 5:
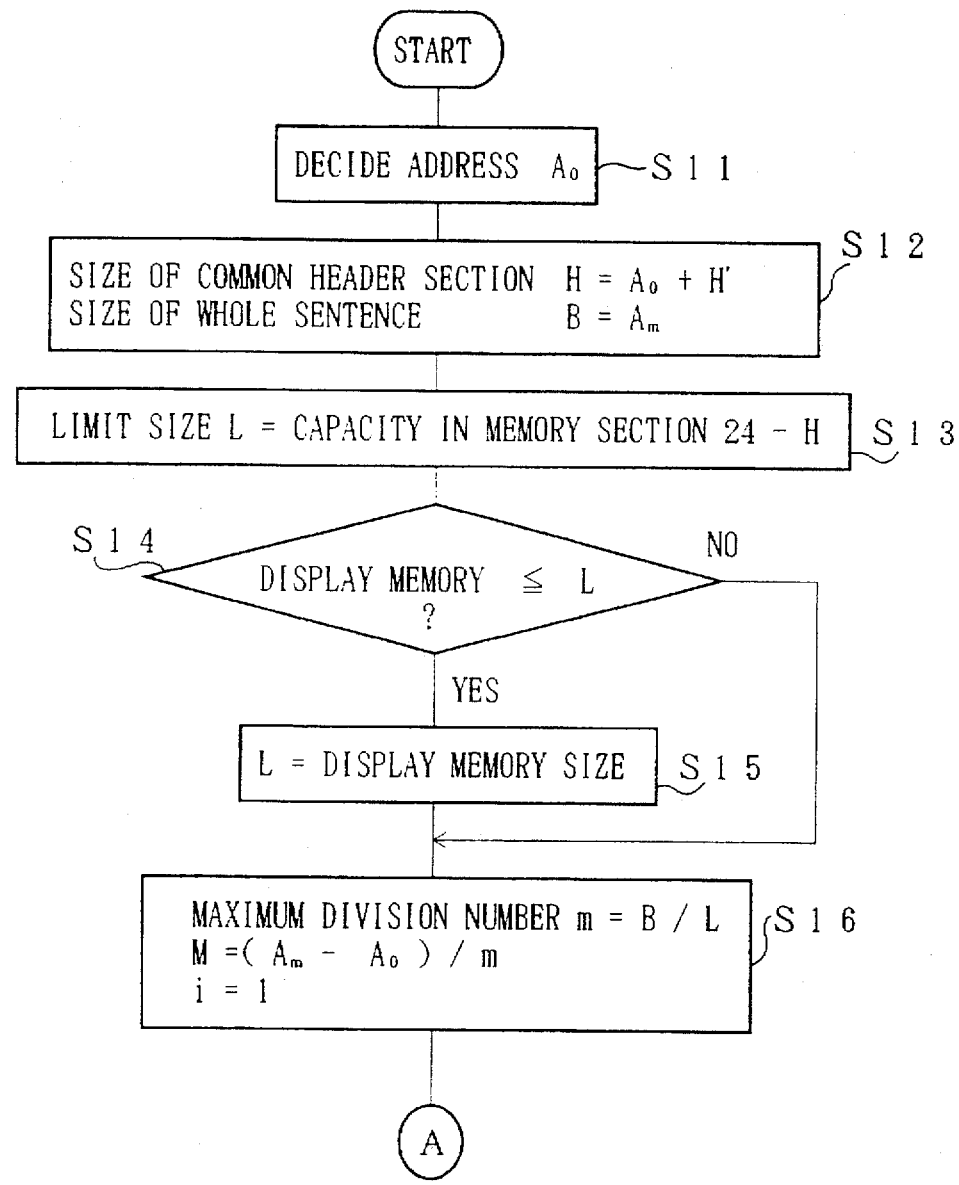
FIG. 5 is a flow chart showing part of an operation algorithm of the division control section of the mail server.
Figure 6:
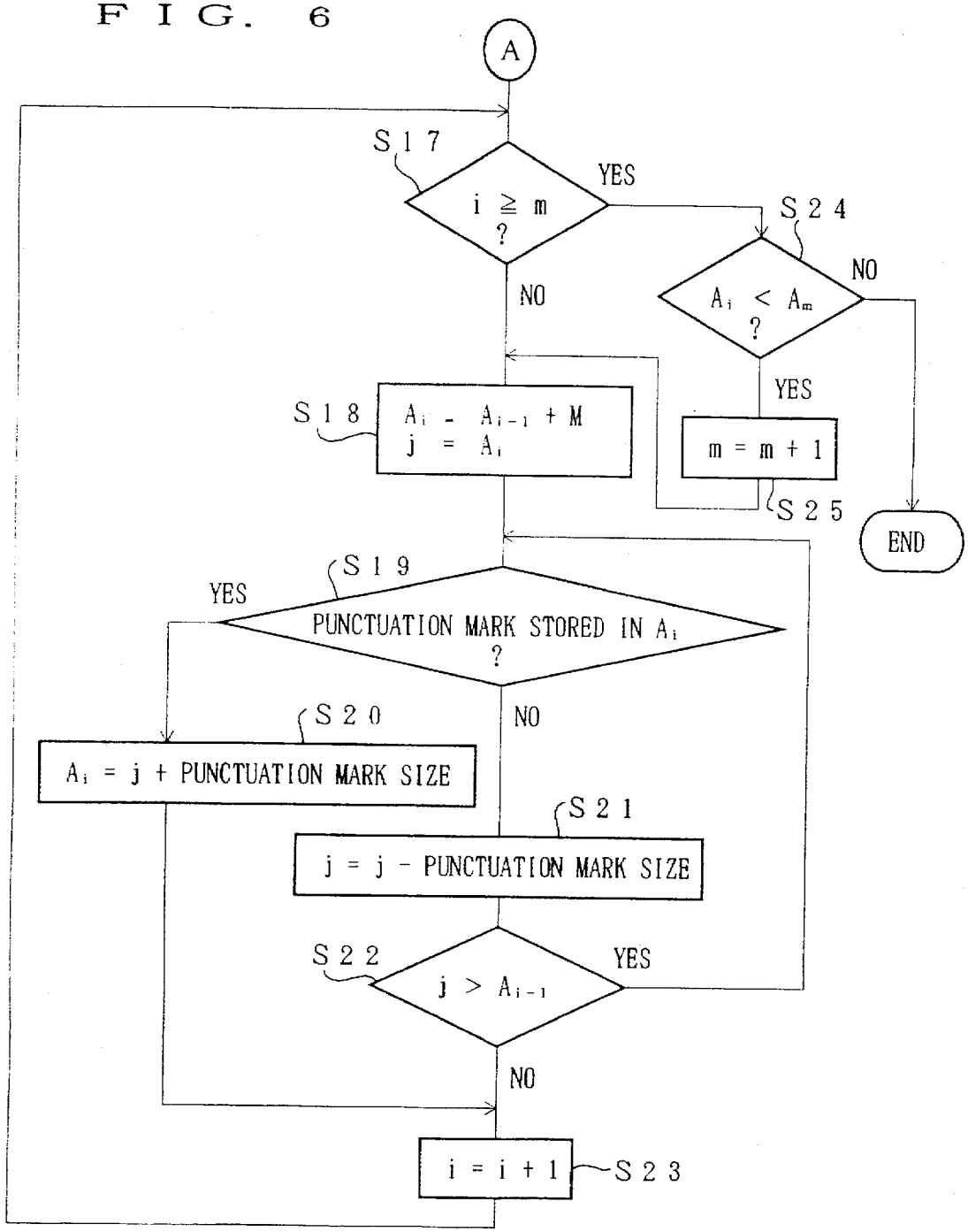
FIG. 6 is a flow chart showing the subsequent part of the operation algorithm shown in FIG. 5.

FIG. 4 is an explanatory drawing showing the divided mail memory section 14 when the main body 30b of the E-mail 30 is divided and stored by the division control section 13 of the mail server 10. FIGS. 5 and 6 are a flow chart showing an operation algorithm of the division control section 13 for dividing the E-mail 30 into the portions.

The division control section 13 first determines an address $A_0$ representative of the boundary between the header section 30a and main body 30b of the E-mail stored into the divided mail memory section 14 (see Step 11 in FIG. 5). The division control section 13, next, determines the size of the header section 30a according to the address $A_0$, and determines the size H of the common header section 30d by adding the size H' required to write the divided E-mail identifier 30c to the address $A_0$ of the header section 30a. Moreover, the division control section 13 determines the size B of the whole main body 30b by subtracting the address $A_0$ representative of the beginning of the main body 30b from the address $A_m$ representative of the end of the main body 30b (Step 12).

Then, the division control section 13 determines a limit memory size L (L>0) of the portion according to the size H required for the common header section 30d and the available capacity in the memory section 24 of the receiving terminal 20. In other words, since the portion to be sent to the receiving terminal 20 is provided with the common header section 30d, the limit memory size L of the portion is determined by subtracting the size H of the common header section 30d from the available capacity in the memory section 24 of the receiving terminal 20 (Step 13).

As the operator inputs through the input section 27 an instruction to display the E-mail on the display section 26, the receiving terminal 20 is arranged to display the portion of the E-mail on the display section 26. Therefore, when the limit memory size L is larger than the memory size (display memory size) of the memory section 24 corresponding to the display capacity of the display section 26 (Step 14), the limit memory size L is set to be equal to the display memory size (Step 15).

Next, the sizes of the portions and a top address of each portion are determined. In this case, first, supposing that the main body 30b of the size B is divided equally into portions of the limit memory size L, a maximum division number m of the E-mail is determined with the equation: m=B/L. Besides, the mean value M of the sizes of the portions is calculated with the equation: M=$(A_m-A_0)$/m. Then the initial value of the portion number i of the portion is set to 1.

Next, the division control section 13 confirms that the portion number i of the portion is smaller than the maximum division number m (see Step 17 in FIG. 6), provisionally sets the result of adding the mean value M to an already determined address $A_{i-1}$ in the divided mail memory section 14 as the address $A_i$, and substitutes the address $A_i$ in the variable j (Step 18). Then the division control section 13 confirms that the content written in the address $A_i$ of the divided mail memory section 14 is ended with a punctuation mark such as a period, a comma, and a question mark (Step 19).

If the content written in the address $A_i$ is ended with a punctuation mark, the division control section 13 sets the result of adding the size of the punctuation mark to the variable j as the address $A_i$ (Step 20). Meanwhile, if the content written in the address $A_i$ is not ended with a punctuation mark, the division control section 13 subtracts the size of the punctuation mark from the variable j (Step 21). Then the division control section 13 confirms that the result is larger than the address $A_{i-1}$ (Step 22), and the operation of the division control section 13 returns to Step 19. In this manner, the division control section 13 searches for the punctuation mark backwardly from the result of adding the mean value M to the already determined address $A_{i-1}$, and if the punctuation mark is found, sets the result of adding the size of the punctuation mark to the variable j as the address $A_i$.

Thereafter, the division control section 13 increases the portion number i of the portion by 1 (Step 23), and repeats the same steps. The division control section 13 sets the sizes and addresses of the portions in this manner.

Note that the maximum division number m is only a standard in dividing. For example, even if the address $A_i$ of the m-th portion is determined with some more available memory at the divided mail memory section 14, and the address $A_i$ has not yet reached the last address $A_m$ of the divided mail memory section 14 ($A_i < A_m$) (Step 24), the division control section 13 replaces the maximum division number m with m+1 (Step 25). The division number of the E-mail is increased by 1 in this manner.

In this manner, as the E-mail is divided by the division control section 13 and written into each address of the divided mail memory section 14, the sending control section 15 of the mail server 10 starts sending in accordance with the reception of the sending request about the E-mail from the receiving terminal 20.

Figure 7:
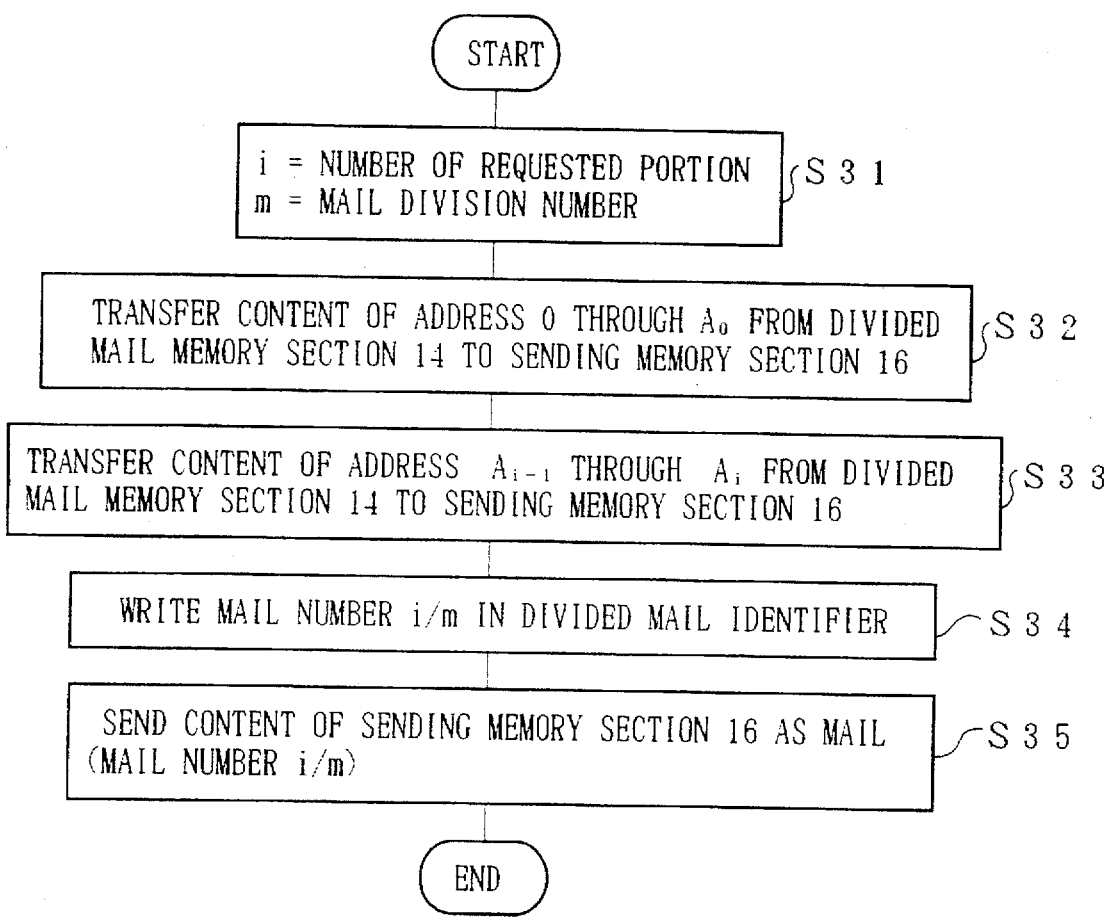
FIG. 7 is a flow chart showing an operation algorithm of a sending control section of the mail server.

FIG. 7 is a flow chart showing an operation algorithm of the division control section 13. Receiving the sending request of the E-mail from the receiving terminal 20, the division control section 13, first, confirms the total number m of the portions in the divided mail memory section 14 and the portion number i of the portion to be sent (see Step 31 in FIG. 7). Then, in order to combine the portion to be sent and the common header section 30d, contents of the addresses 0 through $A_0$ of the divided mail memory section 14 in which the common header section 30d is stored are read out and transmitted to the sending memory section 16 (Step 32). Next, the division control section 13 reads out contents of the addresses $A_{i-1}$ through $A_i$ of the divided mail memory section 14 where the i-th portion is written, and transmits the contents to the sending memory section 16 (Step 33).

The sending memory section 16 combines the i-th portion and the common header section 30d transferred from the divided mail memory section 14 to produce E-mail. At this time, in the common header section 30d, a fraction i/m representing that this E-mail includes the i-th portion out of the total mail division number m is written into the divided E-mail identifier 30c (Step 34). Thereafter, the E-mail is sent to the receiving terminal 20 from the sending section 17 (Step 35).

Sending of the E-mail by the mail server 10 in the above manner is carried out only if the memory section 24 has an empty capacity when an instruction by the operator is inputted through the input section 27 to display the E-mail on the display section 26 of the receiving terminal 20. A memory control table (details follow) is used to confirm if there is an empty capacity in the memory section 24 of the receiving terminal 20.

FIG. 8 is an illustration showing an example of the memory control table of the receiving terminal 20. The memory control table 40 shown in FIG. 8 is arranged so as to be referred to by the main control section 21, reception control section 23 and assembly section 25 of the receiving terminal 20. The memory control table 40 is composed of divided E-mail information 40a which includes three items about the E-mail received by the receiving section 22 and then stored in the memory section 24. The three items are: (1) the mail number (denoted by the fraction i/m), (2) the storage address in the memory section 24, and (3) the size. When there is no portion stored in the address (i.e., there is an empty capacity), "NONE" is set in the mail number column. The receiving terminal 20 is arranged to request the E-mail to be sent only when "NONE" is set in the mail number column in the memory control table 40.

Figure 9:
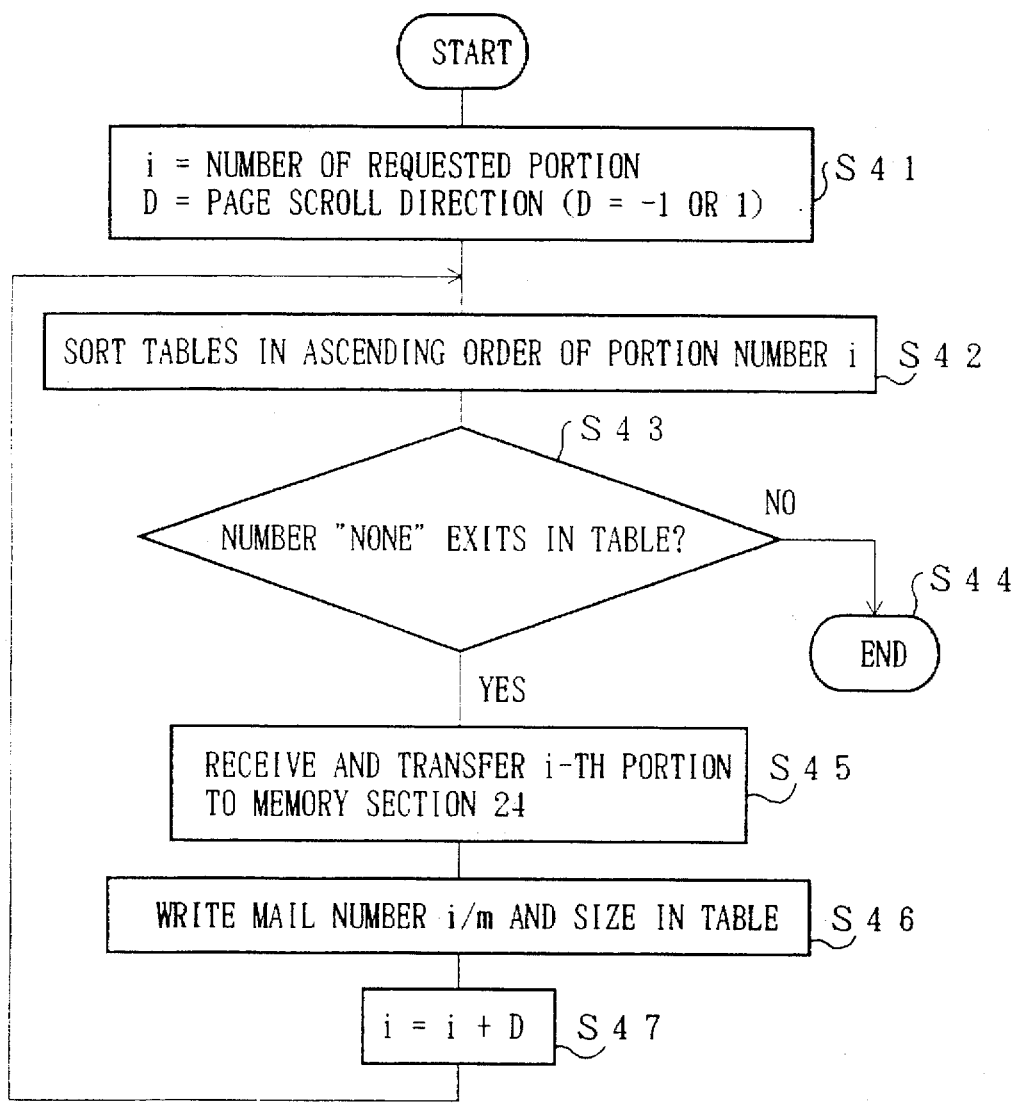
FIG. 9 is a flow chart showing an operation algorithm of a reception control section of the receiving terminal.

FIG. 9 is a flow chart showing an operation algorithm of the reception control section 23 of the receiving terminal 20. Being instructed through an input at the input section 27 by the operator to display the predetermined E-mail stored in the mail server 10 on the display section 26, the receiving terminal 20 requests the mail server 10 to sequentially send the portions of the E-mail. In this case, the mail server 10 determines whether the portions of the E-mail are to be sent in ascending or descending order of the mail numbers according to whether the scroll direction at the display section 26 of the receiving terminal 20 is forward or backward.

Informed from the assembly section 25 of the instruction through operation at the input section 27 for sending the E-mail stored in the mail server 10, the reception control section 23 sets the mail number (the portion number i of the portion) of the E-mail which will be requested to be sent, and also sets D=+1 when the scroll direction on the display section 26 is forward and D=−1 when it is backward (see Step 41 in FIG. 9).

Next, the reception control section 23 sorts the divided E-mail information 40a in the memory control table 40 in ascending order of the portion numbers i in the mail number (i/m) column, then confirms if there is an empty capacity in the memory section 24 according to whether "NONE" is displayed in the mail number column of the memory control table 40 (Step 43). When "NONE" is not displayed in the mail number column in the memory control table 40, the memory section 24 can not store another portion of the E-mail even if it is sent from the mail server 10, therefore the reception control section 23 ends the control (Step 44).

Meanwhile, if "NONE" is displayed in the mail number column in the memory control table 40, the reception control section 23 requests the mail server 10 to send the portion of the E-mail (mail number i/m) which includes the portion of the portion number i. As discussed earlier, the mail server 10 sends the E-mail of the mail number i/m, which includes the i-th portion of the original E-mail, according to the flow chart shown in FIG. 7. As the portion is sent and then received by the receiving section 22 of the receiving terminal 20, the portion is transferred to the memory section 24 (Step 45). In the memory section 24, the common header 30d is removed from the transferred portion, and the rest of the transferred portion is stored in the area denoted by the storage address of the divided E-mail information 40a having "NONE" in its mail number column. Then the mail number i/m of the stored portion is written into the mail number column of the memory control table 40, and the size of the stored portion is written into the size column (Step 46).

As the transferred portion is received by the receiving section 22, and the transferred portion without the common header section 30d is stored in the memory section 24 in this manner, the reception control section 23 sets, to i+D, the portion number i of the portion which is to be received next (Step 47), and the operation of the reception control section 23 returns to Step 42. Then similarly to above, in response to the sending request from the assembly section 25, the portion of the mail number i/m is received and stored in the memory section 24.

As discussed so far, the reception control section 23 is arranged to make the sending request to the mail server 10 and store the portion received by the receiving section 22 in the memory section 24 only when there is an empty capacity in the memory control table 40.

The portion is received an d then stored in the memory section 24 in the above manner in parallel with assembly process (details follow) of each portion by the assembly section 25 and display process (details follow) of the mail assembled by the assembly section 25 on the display section 26.

Figure 10:
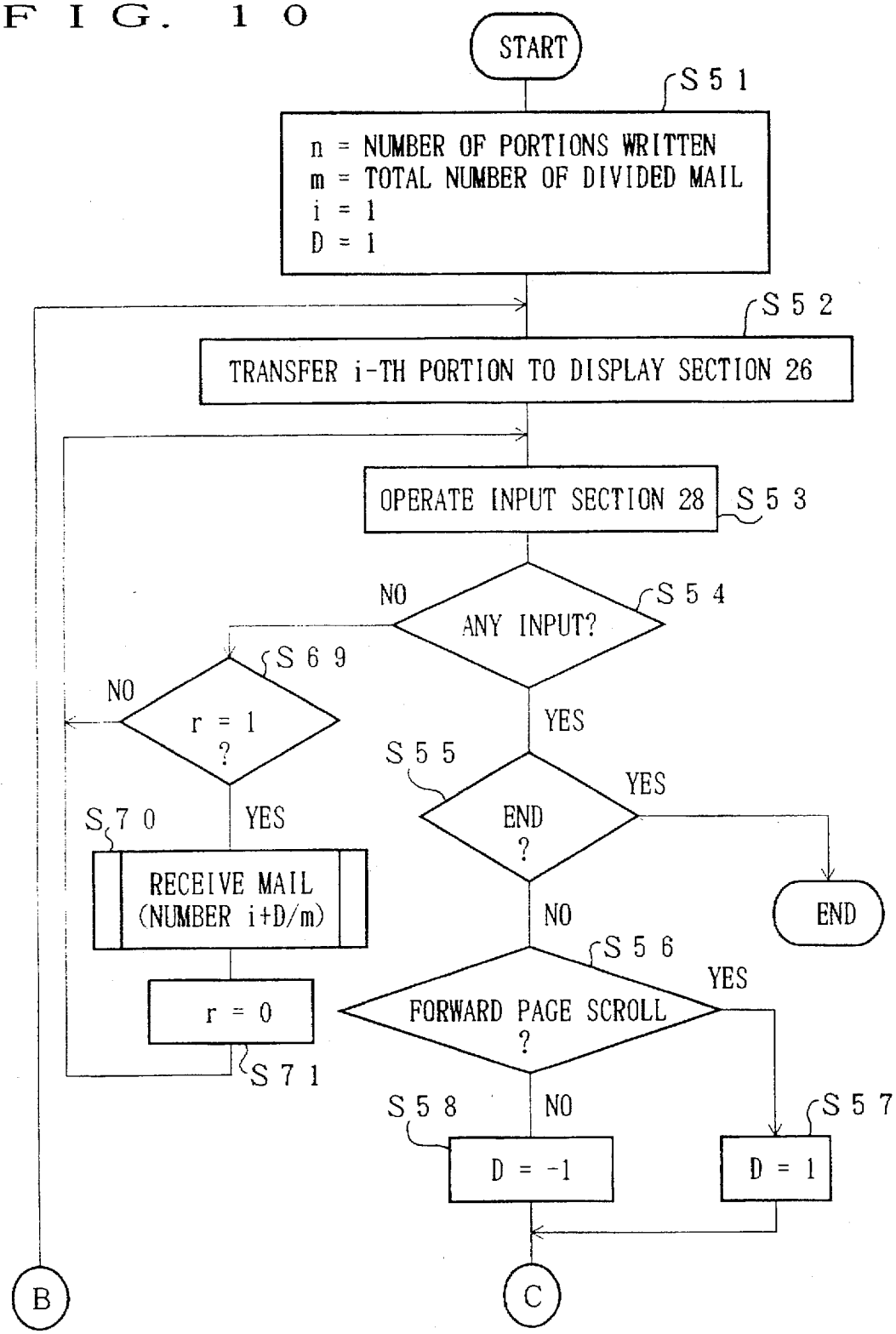
FIG. 10 is a flow chart showing part of an operation algorithm of an assembly section of the receiving terminal.
Figure 11:
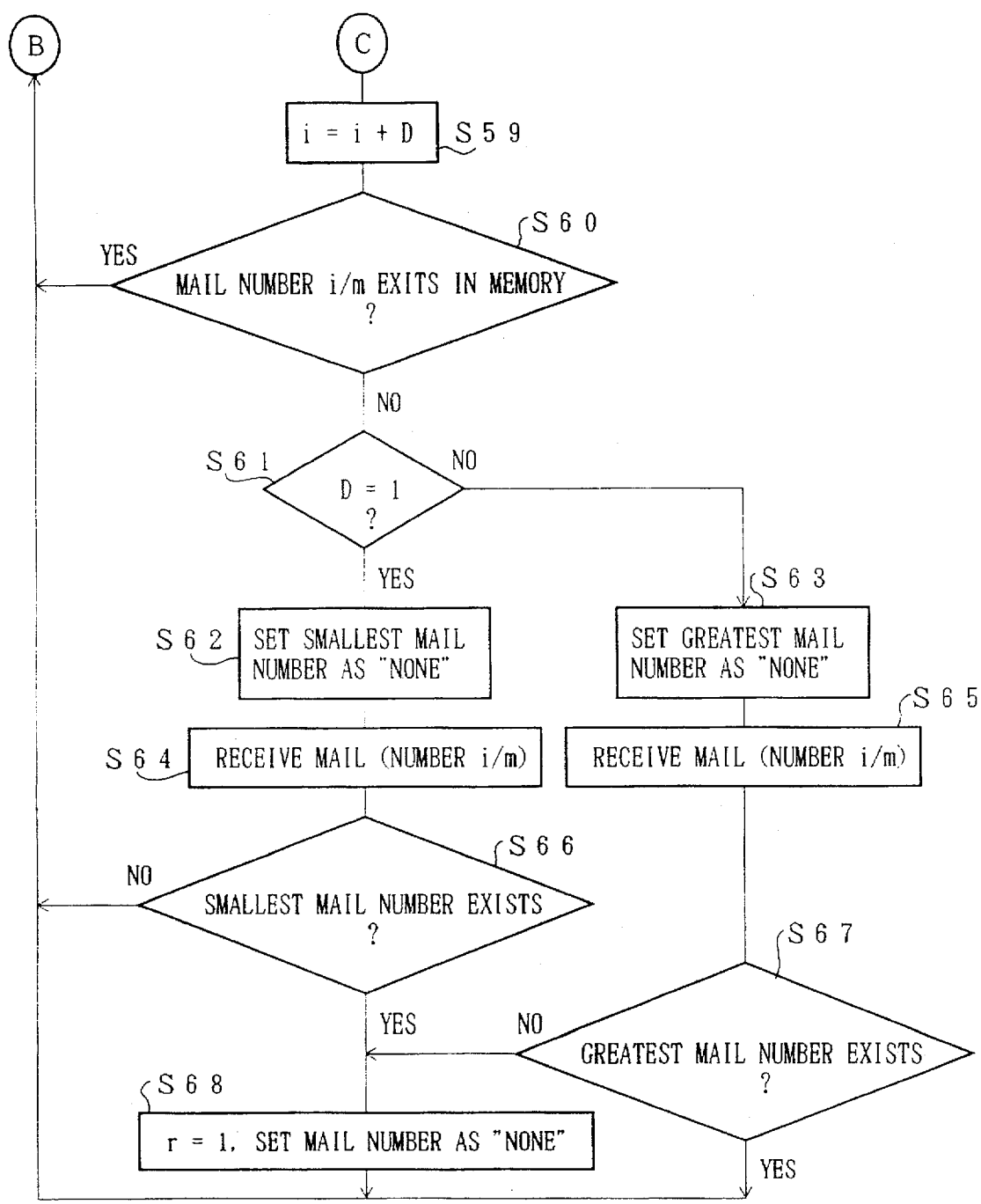
FIG. 11 is a flow chart showing the subsequent part of the operation algorithm of the assembly section shown in FIG. 10.

FIGS. 10 and 11 are a flow chart showing an operation algorithm of the assembly section 25 controlled by the main control section 21. The assembly section 25 confirms that the portions of the original E-mail are stored in the memory section 24 by the reception control section 23 and also confirms the total division number m of the original E-mail. Then in response to an instruction operation through the input section 27 to display the E-mail on the d is play section 26, the assembly section 25 sets the mail number (portion number i) to be displayed to 1 and also sets, for example, the forward scroll direction (D=1) as the scroll direction (see Step 51 in FIG. 10).

In this state, the portion of the portion number i (initially set to 1) stored in the memory section 24 is transferred to the display section 26 (Step 52). This allows the portion of the mail number i to be displayed on the display section 26 so that the operator of the receiving terminal 20 reads the portion of the original E-mail displayed on the display section 26. The assembly section 25 stands by until the input section 27 is operated by the operator (Step 53). When it is confirmed that the operator has operated the input section 27 properly after reading the portion displayed on the display section 26 (Step 54), the assembly section 25 confirms that the operation is not an instruction to end the control (Step 55), and then confirms whether the operation by the operator is for instructing the forward page scroll (Step 56). D=1 is set if the page scroll direction is forward (Step 57), and D=−1 is set if the page scroll direction is backward (Step 58).

In this state, the assembly section 25 sets the mail number i to i+D in order to display the portion which follows the portion (the portion number i) currently displayed on the display section 26 (see Step 59 in FIG. 11). This allows the portion number i of the portion which is to be displayed next to be greater than that of the portion currently on display by 1 if the page scroll direction is forward (D=1), and to be smaller by 1 if the page scroll direction is backward (D=−1).

As the operation comes to this state, the assembly section 25 confirms whether "i/m" exists in the mail number column in the memory control table 40 in order to confirm whether the E-mail (mail number i/m) which includes the portion of the newly set portion number i is already received from the mail server 10 and stored in the memory section 24 (Step 60). If it exists, the operation returns to Step 52, and the i-th portion is read out of the memory section 24 and transferred to the display section 26 to be displayed by the same processes as above.

On the contrary, if "i/m" does not exist in the mail number column in the memory control table 40, that is, if the i-th portion is not stored in the memory section 24, a reqest for sending the E-mail of the mail number i/m is sent to the mail server 10. The assembly section 25 confirms whether the page scroll direction instructed by the operator is forward or backward (Step 61). If the page scroll direction is forward (D=1), the assembly section 25 erases from the memory section 24 the portion of the smallest portion number among the portions stored in the memory section 24, and sets the display of the mail number column of that portion as "NONE" (Step 62). Meanwhile, if the page scroll direction is backward (D=−1), the assembly section 25 erases from the memory section 24 the portion of the greatest portion number among the portions stored in the memory section 24, and sets the display of the mail number column of that portion as "NONE" (Step 63).

In other words, the portions stored in the memory section 24 are no longer necessary after it is confirmed through operation of the input section 27 that the portions have been displayed on the display section 26 and read by the operator of the receiving terminal 20. The processes of Steps 61 and 63 are arranged so that it is confirmed which portion in the memory section 24 is no longer necessary according to whether the page scroll direction is forward or backward. In other words, when the page scroll direction is forward (D=1), since it is understood that the portions are displayed sequentially on the display section 26 in ascending order of the portion numbers starting with the smallest portion number, the portion of the smallest portion number is erased from the memory section 24. Similarly, when the page scroll direction is backward (D=−1), since it is understood that the portions are displayed sequentially on the display section 26 in descending order of the portion numbers starting with the greatest portion number, the portion of the greatest portion number is erased from the memory section 24.

This creates an empty capacity in the memory section 24. The assembly section 25 instructs the reception control section 23 to control the receiving section 22 so as to receive the E-mail of the mail number i/m (Steps 64 and 65). The sending of the E-mail including a portion of the original E-mail by the sending section 17 of the mail server 10, and the transfer and storing to the memory section 24 of a portion of the original E-mail received by the receiving section 22 in this case are carried out according to the respective flow charts shown in FIGS. 7 and 9.

At this time, the assembly section 25 confirms with the memory control table 40 the mail number of the portions of the original E-mail already stored in the memory section 24, and again erases unnecessary portion. In other words, when the page scroll direction is forward (D=1), the assembly section 25 confirms that the portion of the smallest mail number ever stored in the memory section 24 still exists (Step 66), then erases the portion corresponding to that portion number from the memory section 24, and sets the mail number column thereof in the memory control table 40 as "NONE". At the same time, the assembly section 25 sets a flag r representing that there exists an empty capacity in the memory section 24 to the set state (r=1) (Step 68).

In the same manner as above, when the page scroll direction is backward (D=−1), the assembly section 25 confirms that the portion of the greatest portion number ever stored in the memory section 24 still exists (Step 67), the n erases the portion corresponding to that portion number from the memory section 24, and sets the mail number column thereof in the memory control table 40 as "NONE". At the same time, the assembly section 25 sets the flag r to the set state (r=1) (Step 68).

In this manner, the empty capacity is created in the memory section 24. In this case, however, the receiving section 22 is not instructed to receive the portion of the next mail number. At this stage, receiving operation by the receiving section 22 is not carried out.

Thereafter, the operation returns to Step 52. The portion of the original E-mail of the mail number i/m received by the receiving section 22 is transferred to the display section 26 to be displayed. While the operator of the receiving terminal 20 is reading the portion displayed on the display section 26 with no input through the input section 28 (Steps 53 and 54 in FIG. 10), if the flag r representing that there exits an empty capacity in the memory section 24 is in the set state (r=1) (Step 69), the receiving section 22 receives the E-mail including the (i+D)-th portion which is to be displayed next on the display section 26, and the portion is stored in the empty capacity of the memory section 24. The sending of the E-mail including a portion of the original E-mail by the sending section 17 of the mail server 10, and the transfer to the memory section 24 of a portion of the original E-mail received by the receiving section 22 in this case are carried out according to the respective flow charts shown in FIGS. 7 and 9.

FIGS. 12(a) through 12(d) show variable states of the memory control table 40 while the control shown in FIGS. 10 and 11 is being carried out. FIG. 12(a) shows a state in a case where the first three portions of the original E-mail (mail numbers 1/9 through 3/9) are stored in the empty capacity in the memory section 24 of the receiving terminal 20. When the page scroll direction is forward, this state is maintained until the portion included in the E-mail of the mail number 3/9 is displayed on the display section 26.

FIG. 12(b) shows a state where the page scroll direction is forward, the portion included in the E-mail of the mail number 3/9 is displayed on the display section 26, the E-mail of the smallest mail number (i.e., 1/9) in the memory section 24 is erased, then the E-mail of the second smallest mail number (i.e., 2/9) is also erased, and "NONE" is displayed in those mail number columns.

FIG. 12(c) shows a state where the divided E-mail information 40a of the memory control table 40 is sorted in ascending order of i of the mail numbers i/m after the E-mail of the mail number 4/9 is stored in the storing section 24. Upon carrying out the sorting process, the divided E-mail information 40a with "NONE" in its mail number column is sorted so as to be at the rear.

FIG. 12(d) shows that while the portion included in the E-mail of the mail number 3/9 is being displayed on the display section 26, the portion included in the E-mail of the mail number 5/9 is transferred to and stored in the memory section 24.

As discussed so far, the E-mail system in the present embodiment divides the E-mail stored in the mail server into the portions according to the available capacity in the memory section of the receiving terminal. The portions are provided with the respective headers and sequentially sent to the receiving terminal. Then the portions received by the receiving terminal are displayed on the display section.

Therefore, the receiving terminal can properly display on the display section the E-mail stored in the mail server even if there is little memory capacity left at the receiving terminal. Moreover, since the E-mail is divided into the portions ended with the punctuation marks, and the portions are displayed consecutively on the display section, no content of the E-mail is lost. Furthermore, utilization ratio of the receiving terminal is improved by receiving the E-mail including another portion of the original E-mail while one portion is displayed on the display section.

The invention being thus described, it will be obvious that the same may be varied in many ways. Such variations are not to be regarded as a departure from the spirit and scope of the invention, and all such modifications as would be obvious to one skilled in the art intended to be include within the scope of the following claims.

What is claimed is:

1. An electronic mail system, comprising:

a terminal including display means, receiving means for receiving electronic mail, and a receiving memory for storing the received electronic mail; and a mail server including a storage memory for storing the electronic mail, dividing means for dividing the electronic mail, and sending means for sending the electronic mail to the terminal, wherein the terminal informs the mail server of an empty capacity of the receiving memory, and the electronic mail is divided into a plurality of portions by the dividing means of the mail server in accordance with the empty capacity of the receiving memory, the portions being sequentially sent to the terminal from the sending means of the mail server and sequentially displayed on the display means of the terminal.

2. The electronic mail system as defined in claim 1, wherein the dividing means of the mail server divides the electronic mail at a punctuation mark.

3. The electronic mail system as defined in claim 1, wherein the terminal further includes input means for allowing an operator to instruct a scroll direction on the display means, and the mail server further includes sending control means for controlling a sequence of the portions sent by the sending means to the terminal in accordance with the scroll direction.

4. The electronic mail system as defined in claim 1, wherein the terminal further includes reception control means for requesting, while the display means is displaying the portion of the electronic mail, a next portion of the electronic mail to be sent.

5. The electronic mail system as defined in claim 1, wherein the terminal further includes reception control means for confirming the empty capacity of the receiving memory and, only if the empty capacity exists, requesting a next portion of the electronic mail to be sent.

6. The electronic mail system as defined in claim 1 wherein the terminal further includes receiving memory control means for erasing from the receiving memory at least one portion stored in the receiving memory, which is received and already displayed.

7. The electronic mail system as defined in claim 6, wherein the terminal further includes input means for allowing an operator to instruct a scroll direction on the display means, and the receiving memory control means selects a next portion of the electronic mail to be erased in accordance with the scroll direction instructed through the input means.

* * * * *